Figure 1:
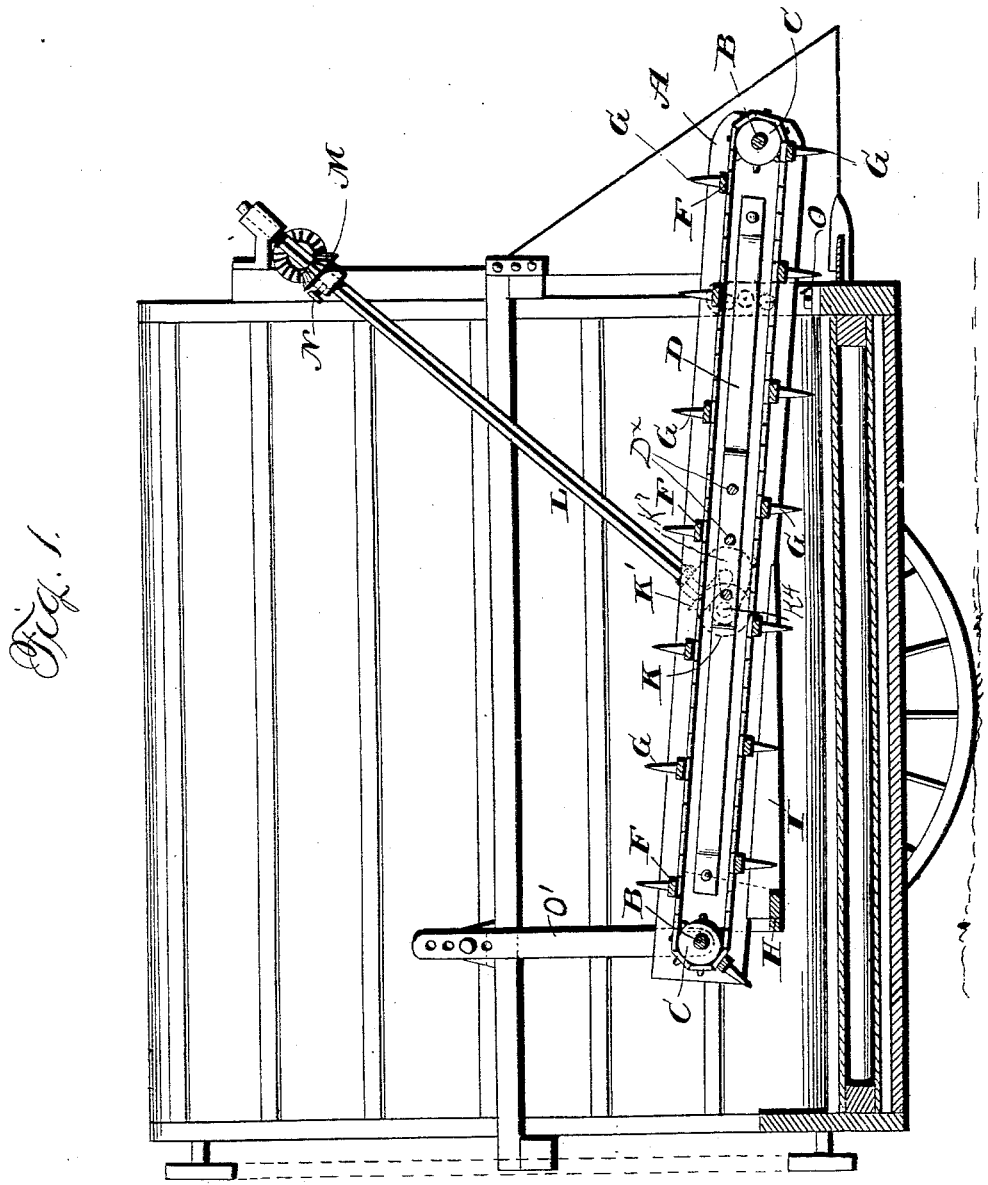

(No Model.)

2 Sheets—Sheet 1.

C. P. WALL.
HARVESTER REEL.

No. 504,795.   Patented Sept. 12, 1893.

Witnesses
C. J. Williamson
A. L. Hough

Inventor
Carl Philip Wall,
by Franklin H. Hough
his Atty.

(No Model.) 2 Sheets—Sheet 2.
C. P. WALL.
HARVESTER REEL.

No. 504,795. Patented Sept. 12, 1893.

Witnesses
C. J. Williamson
A. L. Hough

Inventor
Carl Philip Wall,
by Franklin H. Hough,
his Atty.

United States Patent Office.

CARL PHILIP WALL, OF LA CROSSE, WISCONSIN.

HARVESTER-REEL.

SPECIFICATION forming part of Letters Patent No. 504,795, dated September 12, 1893.

Application filed January 26, 1893. Serial No. 459,813. (No model.)

*To all whom it may concern:*

Be it known that I, CARL PHILIP WALL, a citizen of the United States, residing at La Crosse, in the county of La Crosse and State of Wisconsin, have invented certain new and useful Improvements in Harvester-Reels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in reels for harvesters, and has for its object to provide an endless slatted belt turning on sprocket wheels, and adapted to gather up to the cutters entangled grain, and to then carry the cut grain to the harvester platform, and is then automatically disengaged from the teeth of the slotted belt, by a clearer, which forms an important part of my invention.

The invention consists in the combination and arrangement of the parts as will be hereinafter more fully described, and then specifically defined in the appended claim.

The invention is clearly illustrated in the accompanying drawings, which with the letters of reference marked thereon, form a part of this specification.

In the drawings like letters of reference indicate like parts throughout the several views in which—

Figure 2:
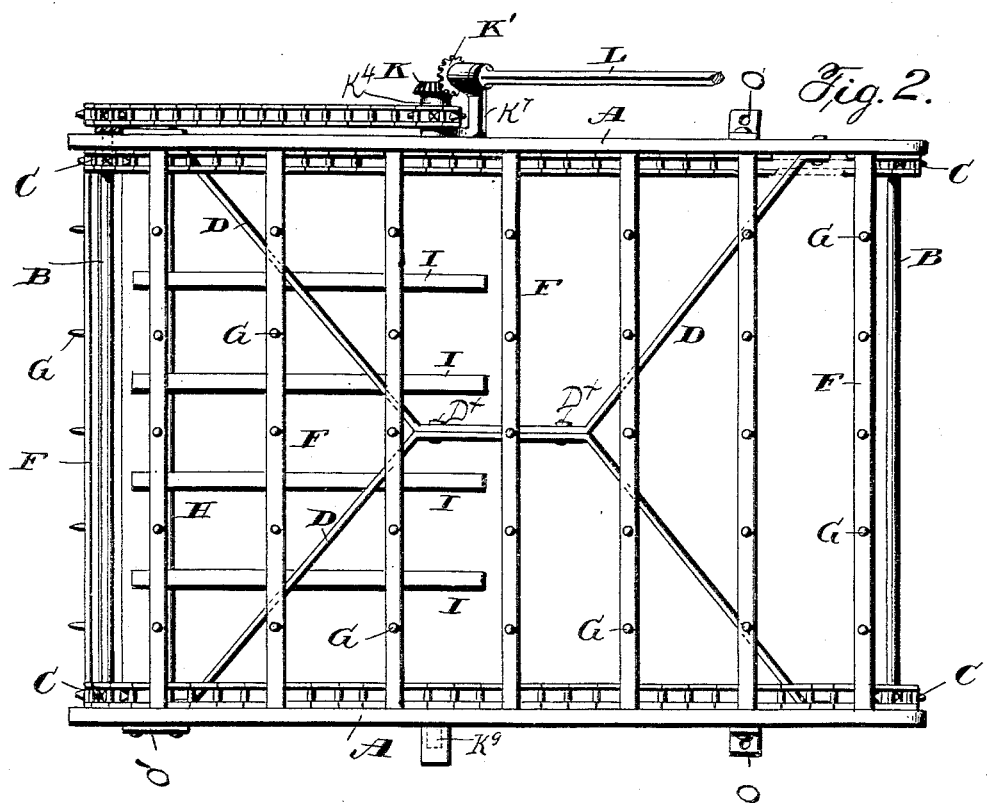
Figure 3:
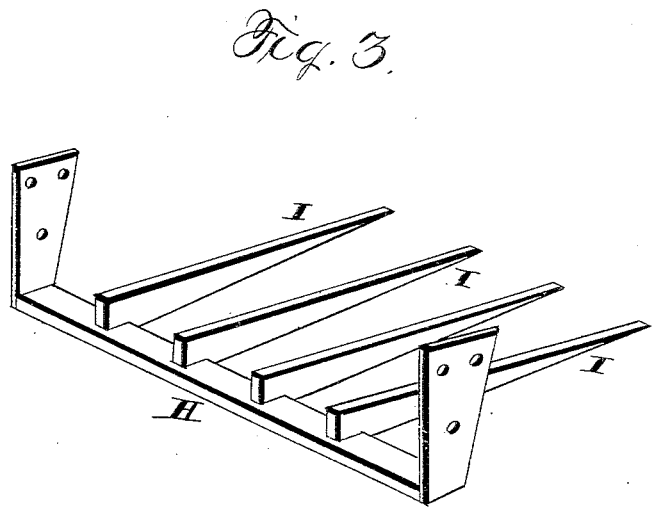

Figure 1 is a vertical longitudinal section showing my improvements. Fig. 2, is a plan of the reel. Fig. 3, is a detailed view of the clearer.

Reference now being had to the details of the drawings by letter, A, A, represent the sides of the reel, in the ends of which are journaled the shafts B, which are provided with sprocket wheels C, on which the slatted belt, made of link chain, turns.

D, D are iron braces for strengthening the sides of the reel, and meet and are riveted together at the points of contact, as seen at $D^\times$.

F. F. are strips of wood, metal or other suitable material, which are provided at suitable distances with hooks or pegs G, securely fastened to the said strips, which serve to gather up the entangled grain and present it to the cutting knives of the harvester, and then convey the grain to the harvester platform where it is released and drops on the board.

H is the clearer, which is attached near the rear end of the reel and on the under side, and so adjusted that the triangular arms I will intermesh with and just escape the teeth of the endless belt, thus serving to disengage the grain from the slatted belt. The reel frame is pivoted at $K^4$ $K^9$ and the bracket $K^7$ in which the lower end of the shaft L is journaled on said shaft $K^4$ so as to preserve the proper operative relation of the parts in the different positions of the reel. The reel is adjustably secured to the harvester by supports, two O being at or near the cutter bar, and one O' at the rear end of the reel, thus allowing the angle of the reel to vary to conform to the requirements of the occasion in gathering up grain of different heights.

For operating my endless slatted belt, I provide means as follows: On one end of the shaft $K^4$ is a beveled geared wheel K, which meshes with a geared wheel K' which is journaled on the end of a square rod L, which rod passes through a beveled geared wheel M, which is operated from power derived from the main shaft. This geared wheel M is so constructed as to allow the rod to pass through it, and by means of a thumb screw N the said wheel is held to the said rod.

The means for connecting my invention to various makes of harvesters will vary and I do not confine myself to any one form, as the spirit of my invention resides in the reel with endless slatted belt and the relieving mechanism.

Having thus described my invention, what I claim to be new, and desire to secure by Letters Patent, is—

In a harvester reel the combination with an endless belt provided with teeth, of a clearer located at the rear end of the reel upon the under side of the said belt and having triangular arms to intermesh with the teeth of the belt and just clear the same, the belt being inclined and the triangular arms of the reliever being arranged horizontally with their inclined faces uppermost.

In testimony whereof I affix my signature in presence of two witnesses.

CARL PHILIP WALL.

Witnesses:
J. E. M. MACCORMAC,
JOHN J. FRUIT.